Patented Sept. 5, 1933

1,925,903

UNITED STATES PATENT OFFICE 1,925,903

CEMENTING COMPOSITION

Almon G. Hovey, Scotia, N. Y., assignor to General Electric Company, a corporation of New York No Drawing. Application September 3, 1931
Serial No. 561,029

5 Claims. (Cl. 87—17)

The present invention relates to cementing compositions and is more particularly concerned with a cementing composition consisting of a cellulose ester, such as nitrocellulose, and a modified alkyd resin.

Present known cementing compositions of the type wherein solutions of either natural resins, such as copal, dammar and the like, or synthetic resins, such as resins of the phenol-formaldehyde type, are employed as the adhesive agents, have several practical defects. Cementing compositions from such natural or synthetic resins all require considerable solvent and must be thinned down to a great extent in order to obtain fast drying properties. The use of considerable quantities of solvent is not only expensive but results in a low solid content and high shrinkage. Where synthetic resins, such as those of the phenol-formaldehyde type, are employed not only must considerable solvent be employed but the resin itself does not have good adhesive properties. It is of course obvious that in order for a cementing composition to be practical it must be fast drying in nature. Attempts to eliminate the use of considerable solvent and thus increase the viscosity of the cementing composition have been found to be impractical because adhesives with little or no solvent and which are very viscous in nature, dry on the surface and leave the inside tacky. If the solid content is too low, as is the case where considerable solvent is employed, there is not sufficient binder present to give the necessary adhesion, especially if the surfaces are porous as is the case when paper, wood, cloth, plaster, unglazed porcelain and the like are employed. In addition, the drying is retarded because of the quantity of solvent which must be evaporated.

Very viscous nitrocellulose or pyroxylin will by itself dry out thoroughly without forming a dry skin on the surface and leaving the inside liquid or tacky. However, pyroxylin is not a good adhesive and when dried out becomes quite brittle. Plasticizers such as dibutyl phthalate, tricresyl phosphate, camphor and the like have been added to various pyroxylin cements to prevent drying out but such additions have not materially improved the adhesiveness of the pyroxylin compositions.

I have found that if I combine a modified alkyd resin with the proper amount of a cellulose ester, such as nitrocellulose, using certain definite proportions, I can produce a cementing composition which is relatively more viscous than ordinary cementing compositions of the type with which this invention is concerned has a higher solid content, does not require a heat-cure, and when sticking porous surfaces has a quick initial "set", and is relatively fast drying in nature.

As is well known, alkyd resins include all those complexes resulting primarily from the interreaction of a polyhydric alcohol and a polybasic acid. The most common example of an alkyd resin is that produced by the interreaction of glycerine and phthalic anhydride. As used herein the term "modified alkyd resin" includes the resinous condensation product resulting from the reaction of one or more polyhydric alcohols, one or more polybasic acids and one or more of the following ingredients: drying oils, semi-drying oils, non-drying oils, the acids derived from such oils, especially the acids derived from the drying oils, with or without other ingredients, such as natural resins and other synthetic resins.

In order to illustrate my invention and the preparation of a cementing composition in accordance therewith the following example is given. As illustrative of a modified alkyd resin suitable for the present invention the following ingredients are employed:

| | Parts by weight |
|---|---|
| Glycerine | 16.35 |
| Phthalic anhydride | 32.68 |
| Linseed oil fatty acids | 11.82 |
| Ethylene glycol | 4.22 |
| Raw China-wood oil | 12.40 |
| Rosin | 22.53 |

These ingredients are treated in a manner substantially as follows: The linseed oil fatty acids, raw China-wood oil and rosin are heated as rapidly as possible in an aluminum vessel to a temperature of 280° C. The mass is now allowed to cool to 260–265° C. and the phthalic anhydride is added, followed by the addition of the glycerine and ethylene glycol. The mass is now heated to 200–220° C. and held at this temperature until the resin becomes clear. The temperature is then raised to 250° C. and the mass cooked with rapid stirring to a 40 second cure on a 200° C. hot plate.

Eleven parts by weight of the resin so formed is dissolved in eleven parts by weight of a suitable solvent, such as acetone or acetone containing a small proportion of alcohol, and mixed with five parts by weight of a suitable plasticizer, such as dibutyl phthalate. To this solution is added the cellulose ester, for example, nitrocellulose. Seventy-three parts by weight of a 35% solution by weight of 0.5 second nitrocellulose in a suitable solvent such as a mixture of equal parts of ethyl acetate and toluol is added. I prefer to employ low viscosity nitrocellulose and have found 0.5 second nitrocellulose, specifically the 35% by weight solution of 0.5 second nitrocellulose admirably suitable for the purposes of my invention. It is, of course, understood that while I specify a 35% by weight solution of 0.5 second nitrocellulose my invention is not limited thereto but I may employ low viscosity nitrocellulose of any proper consistency provided only that the correct amount be employed. The mixture is thoroughly agitated, and the cement is ready for use.

The proportion of resin and cellulose ester, such as the nitrocellulose, employed in the preparation of the cementing composition of my invention is fixed within certain definite limits for I have found that materially outside of this fixed range the cementing composition does not fulfill the objects of my invention. I have found that the permissible range of variation in these ingredients employed in order to have a practical cementing composition is as follows: modified alkyd resin, 11 to 20 per cent by weight; low viscosity nitrocellulose (dry basis), 26 to 22 per cent by weight, or on a wet basis using a 35% by weight solution 0.5 second nitrocellulose 73 to 64 per cent by weight. If the resin content is materially increased beyond the limit given the cementing composition becomes very tacky in nature and will not dry. On the other hand, if the nitrocellulose content is materially increased beyond the limit given the cementing composition loses its adhesiveness and becomes brittle on drying.

As additional illustrations of modified alkyd resins which may be employed as the resin ingredient in the cementing composition of my invention the following are given:

Example 2

| | Parts by weight |
|---|---|
| Phthalic anhydride | 125 |
| Glycerine | 68 |
| Linseed oil fatty acids | 110 |
| Rosin | 35 |
| Castor oil | 18 |

The above ingredients are reacted together by heating rapidly with stirring up to about 250° C., the resin then being cooked 2 hours at from 240-250° C. The resin may then be incorporated with the solvent, plasticizer and pyroxylin solution in the manner outlined above describing the preparation of the cementing composition.

Example 3

| | Parts by weight |
|---|---|
| Glycerine | 23 |
| Phthalic anhydride | 47 |
| Linseed oil fatty acids | 30 |

The glycerine and linseed oil fatty acids are heated in an aluminum vessel to 110° C. The phthalic anhydride is gradually added with stirring and the mass is heated to 210° C. and kept at this temperature until a 1½ minute cure on a 200° C. hot plate is reached. The resin is employed in preparing the cementing composition in the manner outlined in the first example.

Example 4

| | Parts by weight |
|---|---|
| Glycerine | 20 |
| Phthalic anhydride | 46.6 |
| Ethylene glycol | 6.7 |
| Castor oil | 26.7 |

The above ingredients are heated gradually in an aluminum kettle to 265° C. at which temperature the mass is held until a cure point of 45 seconds on a 200° C. hot plate is reached. The resin ingredient is used to make the cementing composition, being added to the nitrocellulose in the manner described in connection with the first example given above.

In order to use the cementing composition the surfaces should be clean, and rough if possible. Smooth surfaces should first be wiped off with a dry cloth free from lint and then swabbed with a suitable solvent for grease. The solvent should not leave a greasy film on evaporation. Acetone is a suitable solvent for this purpose. When the surfaces have been cleaned and dried, a thin coat of the cementing composition should be applied to both surfaces and the surfaces should be pressed together before losing their tackiness. In cementing fibrous materials such as paper and cloth, the cementing composition will usually set up in about five minutes and the article may usually be handled in less than two minutes. For wood and leather, the time required for setting will be longer. For dense surfaces such as glass and metals it is preferable that the surfaces be under a gentle pressure while the cementing composition is setting. Where the surfaces are dense the period of drying of the cementing composition may be considerably hastened by the application of heat (up to 100° C. but not over this temperature). Where faster or slower drying periods are desired suitable thinners for this purpose may be employed. For example, for faster drying, a suitable thinner for use is a volatile solvent mixture consisting principally of acetone with small proportions of ether and ethyl acetate. For most purposes the cement is suitable without being thinned.

The cementing composition of my invention is a good adhesive for a variety of substances and in addition to those mentioned above may be included its use as an adhesive for sticking aluminum to leather, felt to unglazed porcelain, labels to tin cans, aluminum to paper, aluminum to aluminum. It has good electrical properties. Its resistance to gasoline and mineral oil is excellent. Since it is not a water-dispersed colloid it resists the effects of humidity. It is not attacked by micro-organisms as are ordinary adhesives, e. g. glue and casein. It does not melt when warmed, as does shellac, or lose its bonding properties at 70°-100° C. as does ordinary rubber cement.

While I have illustrated my invention specifically by employing nitrocellulose as the cellulose ester, it is to be understood that it is within the scope of my invention to employ any other cellulose ester. I may, for example, employ low viscosity cellulose acetate in the preparation of my cementing composition. I prefer, however, to use nitrocellulose as the cellulose ester because of its relative cheapness, its inherent strength, the wider range of solvents which may be employed and the general satisfactory results which may be obtained by its use.

The present application is a continuation-in-part of my copending application Serial No. 493,693, filed November 5, 1930, and assigned to the same assignee as the present application.

What I claim as new and desire to secure by Letters Patent of the United States, is:

1. A cementing composition comprising about 11 to 20 parts by weight of a modified alkyd resin which is the reaction product of glycerine, phthalic anhydride, linseed oil fatty acids, ethylene glycol, China-wood oil and rosin, and about 26 to 22 parts by weight of low viscosity cellulose ester calculated on a dry basis, together with sufficient liquid to form a viscous mass.

2. A cementing composition comprising about 11 to 20 parts by weight of a modified alkyd resin which is the reaction product of glycerine, phthalic anhydride, ethylene glycol and castor oil, and about 26 to 22 parts by weight of low viscosity cellulose ester calculated on a dry basis, together with sufficient liquid to form a viscous mass.

3. A cementing composition consisting of about 11 parts by weight of an organic solvent, about 5 parts by weight of a plasticizer, about 73 parts by weight of a 35% solution by weight of 0.5 second nitrocellulose and about 11 parts by weight of a modified alkyd resin, said resin being the reaction product of glycerine, phthalic anhydride, linseed oil fatty acids, ethylene glycol, China-wood oil and rosin.

4. A cementing composition consisting of about 11 parts by weight of an organic solvent, about 5 parts by weight of a plasticizer, about 73 parts by weight of a 35% solution by weight of 0.5 second nitrocellulose and about 11 parts by weight of a modified alkyd resin, said resin being the reaction product of glycerine, phthalic anhydride, ethylene glycol and castor oil.

5. A cementing composition consisting of about 11 parts by weight of an organic solvent, about 5 parts by weight of a plasticizer, about 73 parts by weight of a 35% solution by weight of 0.5 second nitrocellulose and about 11 parts by weight of a modified alkyd resin, said resin being the reaction product of glycerine, phthalic anhydride and linseed oil fatty acids.

ALMON G. HOVEY.